US012741894B2

(12) United States Patent
Drewery et al.

(10) Patent No.: US 12,741,894 B2
(45) Date of Patent: Sep. 22, 2026

(54) BIOFILM REACTOR HAVING AT LEAST ONE WEIGHTED MEMBER

(71) Applicants: Tommy Gig Drewery, Longview, TX (US); Trina Vern Drewery, Longview, TX (US)

(72) Inventors: Tommy Gig Drewery, Longview, TX (US); Trina Vern Drewery, Longview, TX (US)

( * ) Notice: Subject to any disclaimer, the term of this patent is extended or adjusted under 35 U.S.C. 154(b) by 406 days.

(21) Appl. No.: 18/468,173

(22) Filed: Sep. 15, 2023

(65) Prior Publication Data

US 2024/0076219 A1 Mar. 7, 2024

Related U.S. Application Data

(63) Continuation-in-part of application No. 17/837,928, filed on Jun. 10, 2022, now Pat. No. 12,434,988.

(51) Int. Cl.
*C02F 3/10* (2023.01)
*C02F 3/20* (2023.01)

(52) U.S. Cl.
CPC .............. *C02F 3/101* (2013.01); *C02F 3/103* (2013.01); *C02F 3/108* (2013.01); *C02F 3/109* (2013.01); *C02F 3/20* (2013.01)

(58) Field of Classification Search
CPC .... C02F 3/06; C02F 3/20; C02F 3/101; C02F 3/10; C02F 3/103; C02F 3/109
USPC .......................................................... 210/615
See application file for complete search history.

(56) References Cited

U.S. PATENT DOCUMENTS 4,625,801 A * 12/1986 McLaughlin ........... B09C 1/002 417/147
5,162,083 A 11/1992 Forbes
5,266,239 A 11/1993 Drewery
6,096,203 A 8/2000 Drewery
6,165,359 A 12/2000 Drewery
6,254,066 B1 7/2001 Drewery
6,394,677 B2 * 5/2002 Wang ..................... B43K 23/02 401/202
6,554,996 B1 4/2003 Rebori
7,718,067 B2 5/2010 Holt
12,434,988 B2 * 10/2025 Drewery .................. C02F 3/20
(Continued)

FOREIGN PATENT DOCUMENTS

DE 3534163 A1 * 1/1987 ................ C02F 3/06

OTHER PUBLICATIONS

Grabowski, DE 3534163, English machine translation, pp. 1-3 (Year: 1897).*

*Primary Examiner* — Claire A Norris
(74) *Attorney, Agent, or Firm* — Egbert, McDaniel & Swartz, PLLC

(57) ABSTRACT

A wastewater treatment apparatus has a tank having an access opening therein, at least one fixed film media pod positioned in the interior of the tank, a diffuser positioned in the interior of the tank, and an air pump connected to the diffuser. The fixed film media pod is formed of a mesh material and has openings framed by the mesh material. At least one weight is affixed to the fixed film media pod adjacent to a bottom thereof so as to maintain a vertical orientation of the fixed film media pod in the tank. The diffuser can be affixed to the fixed film media pod so as to aerate liquid in the interior of the tank.

10 Claims, 6 Drawing Sheets

(56) References Cited

U.S. PATENT DOCUMENTS

| | | | | |
|---|---|---|---|---|
| 2009/0272689 | A1* | 11/2009 | Ladouceur | C02F 3/06<br>210/615 |
| 2016/0122216 | A1* | 5/2016 | Stark | C02F 3/22<br>210/220 |
| 2017/0320761 | A1* | 11/2017 | Boutet | C02F 3/303 |

* cited by examiner 300
302
306
308
304
310

314
312
302
316
322
320
318
326
310
324
330

BIOFILM REACTOR HAVING AT LEAST ONE WEIGHTED MEMBER

CROSS-REFERENCE TO RELATED APPLICATIONS

The present application is a continuation-in-part of U.S. patent application Ser. No. 17/837,928, filed on Jun. 10, 2022, presently pending.

FIELD OF THE INVENTION

The present invention relates to wastewater treatment. More particularly, the present invention relates to biofilm wastewater treatment tanks that are adapted to aerate the wastewater. The present invention also relates to weights that are used to support biofilm reactors within the wastewater of a wastewater treatment tank.

BACKGROUND OF THE INVENTION

Septic tank and drainfield systems have a history of failure problems. Although the systems have been used for years and are still a preferred method for treating and dispersing domestic wastewater from homes and small commercial establishments, such septic tank and drainfield systems have inherent problems and also pollute the environment.

One problem is that treatment in the septic tank is minimal. The septic tank utilizes anaerobic bacteria to carry out the treatment. This anaerobic bacteria is bacteria that does not use oxygen and is consequently very slow at treating the wastewater. Consequently, when the wastewater leaves the septic tank toward the drainfield, the wastewater is poorly treated. The effluent from the septic tank is high in total suspended solids and high in biological oxygen demand. This places a high treatment demand on the drainfield before the effluent is dispersed through the soil interface of the drainfield and into the surrounding soil and onto the ground water. In fact, it is the soil interface where the final treatment of the septic effluent occurs. The soil interface of the drainfield is generally described as the bottom and inside walls of the drainfield. The same anaerobic bacteria utilized in the septic tank is responsible for the final treatment at the soil interface in the drainfield. This anaerobic treatment process forms a sludge biomat at the soil interface. In other words, the bacteria uses the soil interface as a media to grow on. As the effluent passes through the biomat, the final treatment occurs and the biomat grows or enlarges.

From a management perspective, this anaerobic treatment process is inadequate. The very treatment process that provides final treatment of the effluent will plug the soil interface. As the biomat grows, more and more soil becomes plugged. When enough soil of the drainfield is plugged, the remaining soil is inadequate to treat and disperse the effluent from the septic tank. As a result, the septic tank and the drainfield start to fail. The failure starts with short periods of high-level conditions in the septic tank which can affect the proper use of the facilities in the home. The failure can also start with inadequately treated effluent surfacing at the drainfield area. Both of these conditions can occur simultaneously. If left unattended, complete failure is imminent. During this condition, the environment is being polluted. Studies have been conducted which reveal groundwater and well water contamination without the aforementioned signs of failure.

In the past, septic tank and drainfield failure has been somewhat accepted. Septic tank and drainfield replacement has been the only solution.

Experiments and testing have shown that aerobic system effluent can be a much higher quality effluent, much lower in total suspended solids and much lower in biological oxygen demand. Therefore, the drainfield has to do much less treatment. The aerobic system is also high in dissolved oxygen and has high levels of aerobic bacteria. Not only does the aerobic system effluent protect the drainfield from further plugging, it starts to reverse the drainfield plugging that has already occurred. No longer does the drainfield operate in the anaerobic mode (void of oxygen), but it operates in a high dissolved oxygen state. It is this high dissolved oxygen in the presence of high levels of aerobic bacteria that destroys the anaerobic biomass and consumes it. As this occurs, the soil interface becomes unplugged and proper drainfield functions are restored.

Due to these findings, septic tank conversion products can convert already installed septic tanks into aerobic treatment systems. For example, U.S. Pat. No. 5,162,083, issued on Nov. 10, 1992 to Forbes et al., describes a method and apparatus for converting a standard anaerobic septic tank system to an aerobic system where the effluent discharged at a high level of quality sufficient to meet or exceed all national and state standards. The method provides a series of steps that are used to convert a pre-existing anaerobic septic tank to a highly efficient aerobic system. The system includes an aerator and a clarifier insert which has the capability of adding an optional chlorine chamber which dispenses chlorine into the effluent line in its final stages. The system requires building a new lid and attaching a clarifier and diffuser drops to the lid. The lid and the attached clarifier and diffuser drops are lowered into the septic tank and attached to the septic tank. This method requires excavation and hoisting equipment. This is costly and can cause damage to the finished yard landscaping.

U.S. Pat. No. 6,554,996, issued on Apr. 29, 2003 to R. J. Rabori, describes a wastewater treatment system and apparatus for converting a typical anaerobic septic tank system into an efficient aerobic treatment system for treating a liquor containing biodegradable wastes. The apparatus includes a collapsible reactor module that can pass through a relatively small opening in the septic tank cover. The reactor module contains media therein in which the liquor to be treated is recirculated and aerated. The reactor module is full of fixed film media. Although this device does away with the costly excavation and hoisting procedures, the product itself is costly due to the nature of the fixed film media systems.

As septic tank drainfield systems continue to fail, a more cost-effective septic tank conversion method is required. U.S. Pat. No. 7,718,067, issued on May 18, 2010 to K. K. Holt, teaches a method and apparatus for mediating a failed or failing wastewater treatment system. This method includes a positive air generating pressure pump directing air through a tube to an air stone suspended in the effluent. Attached growth bacteria grow on a plurality of random directional brushes in an effluent tank, e.g. a septic tank. This method allows for installation of the equipment through an opening in the septic tank lid and avoids expensive excavating and hoisting. It also prevents finished landscape destruction. Also, the cost is much less than fixed film media aerobic systems. The method of the Holt patent places a diffuser or aerator directly into the septic tank. Air is introduced through the diffuser and causes the contents of the septic tank to be mixed. As the contents are mixed together, dissolved oxygen is transferred into the solution. The septic tank is converted from an anaerobic environment to an aerobic environment. Aerobic bacteria begin to multiply and form suspended solids within the septic tank. As the aerobic bacteria colony grows or multiplies, so do the suspended solids within the septic tank. Although this process gives the septic tank the ability to aerobically treat the household waste, it simultaneously creates a problem in that the suspended solids carry out of the septic tank to the drainfield into the environment. These suspended solids are mostly made up of partially metabolized or digested wastes and consequently cause damage to the drainfield and the environment.

The present inventor is the inventor identified in several patents associated with aerobic wastewater treatment systems. For example, U.S. Pat. No. 5,266,239, issued on Nov. 30, 1993 to the present inventor, describes a diffuser assembly for an aeration system of a wastewater treatment plant. This aeration apparatus has an air line connected to an air source, a drop line connected in fluid communication with the air line, a check valve positioned in the drop line between an orifice at the bottom of the drop line and the air line, and a diffuser member extending around the orifice on the drop line. The check valve serves to prevent liquid from passing therethrough. The drop line includes a tube which extends downwardly from the air line.

U.S. Pat. No. 6,096,203, issued on Aug. 1, 2000 to the present inventor, teaches a wastewater treatment system having a tank with an inlet and an outlet and an offset access opening residing at the top of the tank. A clarifier compartment is positioned within the tank. An aeration compartment is formed within the tank around the exterior of the clarifier compartment. Aerators extend into the aeration compartment so as to supply air to the wastewater within the aeration compartment. The access opening is formed between a center of the top and outer wall of the tank. Each of the aerators includes an air inlet, a conduit connected to the air inlet, a diffuser assembly connected to an end of the conduit opposite the air inlet, and an anchor connected to the diffuser assembly opposite the conduit so as to maintain the diffuser in a fixed position within the aeration compartment.

U.S. Pat. No. 6,165,359, issued on Dec. 26, 2000 to the present inventor, shows a high-strength wastewater treatment system having a first tank with an inlet and an outlet, an aerator positioned within the first tank for passing oxygen into the wastewater within the first tank, a second tank having a clarifier compartment positioned therein, an aeration device positioned in the second tank for passing oxygen into a liquid within the second tank, and a pipe connected the first tank and the second tank for passing liquid from the second tank to the first tank. The pipe has an end opening within the second tank and a diffuser connected to the pipe within the first tank. The diffuser is a venturi diffuser. An air pump is connected to the venturi diffuser for injecting air into the narrow section of the diffuser. This delivery of air serves to draw liquid from the second tank through the pipe and into the first tank.

U.S. Pat. No. 6,254,066, issued on Jul. 3, 2001 to the present inventor, provides an apparatus for aerating liquid in a wastewater treatment tank. The apparatus has a submergable motor with a shaft extending outwardly therefrom, a supporting member affixed to the submergable motor and adapted to maintain the submergable motor in a position within the liquid in the wastewater treatment tank. A propeller is affixed to the shaft of the submergable motor. A housing extends around the propeller and the shaft. An air tube is connected to the housing and is adapted to pass air interior of the housing between the propeller and the motor.

The present inventor has filed U.S. patent application Ser. No. 17/837,928 for a "Biofilm Reactor for Treating Wastewater". This application described a biofilm reactor that is received in the tank so as to treat the wastewater. In particular, this patent application describes a wastewater treatment apparatus having a tank with an access opening thereon, at least one fixed film media pod positioned in an interior of the tank, a diffuser positioned in the interior of the tank, and an air pump connected to the diffuser. The tank has an inlet adapted to allow wastewater to enter the interior of the tank and an outlet adapted to allow an effluent to exit the tank. The fixed film media reactor is formed of a polymeric material. This fixed film medium pod has openings framed by the polymeric material. In particular, in this application, the fixed film media pod has a top ring and a bottom ring. The fixed film media pod is formed of a polymeric mesh material extending over and around or under and around the top ring and the bottom ring. A plurality of weights are positioned on the fixed film media pod adjacent to a bottom thereof. These weights were adapted to maintain a vertical orientation of the fixed film media pod within a liquid in the tank.

A problem that was encountered as a result of the use of these weights was that the application of several weights around the interior of the fixed film media pod required the application of an adhesive to the surfaces of the weights and to the surfaces of the fixed film media pod. Over time, this adhesive would be exposed to the corrosive forces of the wastewater within the tank. As such, there was a tendency, over time, for the adhesive to dissolve and the weights to become loosened and released from the fixed film media pod. It was also found that the application of such weights in various locations around the interior of the fixed film media pod was somewhat difficult and often result in uneven and unbalanced placement. Similarly, the application of separate weights did not create an even amount of weight distribution entirely around the interior diameter of the fixed film media pod. As such, a need developed so as to develop a weight that could be secured permanently to the fixed film media pod and which would inherently distribute the weight evenly around the entire circumference of the fixed film media pod. It was important to be able to do this in a simple, easy, inexpensive and efficient manner.

During the use of the fixed film media reactor, microbes and other materials will accumulate on the surfaces of the fixed film media pod. These microbes and other materials will have a certain amount of buoyancy. Over time, as more and more microbes and other materials are accumulated on the surfaces of the fixed film media reactor, the buoyancy of these microbes will tend to cause the fixed film media reactor to move from a generally vertical orientation. As such, a need exists so as to maintain the fixed film media reactor in a vertical orientation prior to and during the accumulation of microbes and other materials on the surfaces of the fixed film media reactor.

Under those circumstances where a diffuser is connected to the fixed film media reactor, the diffuser will diffuse air from an air pump into the wastewater within a tank. The passing of the air through the diffuser will create a certain amount of buoyancy within the diffuser. This buoyancy will cause the fixed film media reactor to assume a non-vertical orientation. As such, a need has developed so as to maintain the fixed film media reactor and diffuser in its vertical orientation. The vertical orientation is important for the proper processing of the microbes from the wastewater.

It is an object the present invention to provide a wastewater treatment system that transforms a septic tank into a biofilm reactor.

It is another object of the present invention to provide a wastewater treatment apparatus that allows drainfields to recover.

It is another object of the present invention to provide a wastewater treatment apparatus that does not require replacement of existing tanks.

It is another object of the present invention to provide a wastewater treatment apparatus that avoids septic tank replacement costs.

It is another object of the present invention to provide a wastewater treatment apparatus that avoids destruction of property.

It is another object of the present invention to provide a wastewater treatment apparatus that protects the environment.

It is another object of the present invention to provide a wastewater treatment apparatus that reduces the release of pollutants into the environment.

It is another object of the present invention to provide a wastewater treatment apparatus that is quickly and easily installed.

It is another object of the present invention to provide a wastewater treatment apparatus that avoids the use of heavy equipment on existing installed tanks.

It is another object of the present invention to provide a wastewater treatment apparatus in which greater than 90% of the wastewater treatment occurs inside the treatment tank.

It is another object of the present invention to provide a wastewater treatment apparatus that produces a clear and odorless effluent.

It is another object of the present invention to provide a wastewater treatment apparatus that does not require a clarifier.

It is another object of the present invention to provide a wastewater treatment apparatus that avoids the formation of suspended solids It is another object of the present invention to provide a wastewater treatment apparatus that avoids the stirring of sludge at the bottom of the tank.

It is another object of the present invention to provide a wastewater treatment system that provides sludge storage management at the bottom of the tank below the media.

It is a further object of the present invention to provide a wastewater treatment apparatus that has minimal transportation costs.

It is still a further object of the present invention to provide a wastewater treatment system that can utilize standard industry septic tanks without further modification (including compartment sizing).

It is still another object of the present invention to provide a wastewater treatment apparatus that can fully nitrify the wastewater.

It is a further object of the present invention to provide a wastewater treatment system where the treatment capacity can be modified at any time in the future.

It is a further object of the present invention to provide a wastewater treatment system having a weight at a bottom of the biofilm reactor that is permanently attached and resistive of any corrosive forces within the wastewater treatment tank.

It is still another object of the present invention to provide a wastewater treatment system wherein a weight affixed to the bottom of the fixed film media pod distributes forces evenly across an entire interior circumference of the fixed film media pod.

It is a further object of the present invention to provide a wastewater treatment system having a biofilm reactor having a ballasting weight in which the ballasting weight is inexpensive and easy to install.

It is a further object of the present invention to provide a wastewater treatment system in which the fixed film media pod is maintained in a vertical orientation.

These and other objects and advantages of the present invention will become apparent from a reading of the attached specification and appended claims.

BRIEF SUMMARY OF THE INVENTION

The present invention is a wastewater treatment apparatus that comprises a tank having an access opening thereon, at least one fixed film media pod positioned in the interior of the tank, a diffuser positioned in the interior of the tank, and an air pump connected to the diffuser. The tank has an inlet adapted to allow wastewater to enter an interior of the tank. The tank has an outlet adapted to allow effluent to exit the tank. The fixed film media pod is formed of a material. This fixed film media pod has openings framed by the material. The fixed film media pod has at least one weight adjacent to a bottom thereof. This weight is adapted to maintain a vertical orientation of the fixed film media pod in a liquid in the tank. The diffuser is adapted to aerate liquid in the interior of the tank.

In the present invention, the weight comprises a weighted ring affixed to the fixed film media pod. This weighted ring comprises a wire or cable formed into a generally circular configuration. The wire or cable is of a metallic material. In a preferred embodiment of the present invention, the wire or cable has a weight of approximately two ounces. The wire or cable has free ends. These free ends are connected together in a certain generally circular configuration by a tubular member.

The weighted ring is secured to the fixed film media pod by fasteners. In a preferred embodiment, these fasteners comprise a plurality of zip-ties wrapped around the weighted ring and around a surface of the fixed film media pod. The plurality of zip-ties are in spaced relation to each other.

The fixed film media pod has a top ring and a bottom ring. The fixed film media pod can be formed of a mesh material extending over and around or under and around the top ring and the bottom ring. The weighted ring is positioned slightly above the bottom ring. The bottom ring, in the preferred embodiment, extends around an interior of the fixed film media pod. The weighted ring extends around the interior of the fixed film media pod.

Each of the fixed film media pods has a tubular structure extending vertically in the interior of the tank. This tubular structure is positioned above a bottom of the tank. The tubular structure has an interior mesh structure extending generally across the interior diameter of the tubular structure. The weight counterbalances the float such that the fixed film media pod is adapted to float in a generally vertical orientation in a liquid in the tank.

In certain circumstances, a diffuser is used in association with the fixed film media pod. In normal use, depending on the character of the wastewater and the amount of wastewater being processed, the ratio of fixed film media pods that have a diffuser in relation to those that do not have a diffuser will vary. Under certain circumstances, the ratio will be 1:1. Under other circumstances, there will be two fixed film media pods without diffusers for every media pod with a diffuser. Still further, in other circumstances, there can be three fixed film media pods without diffusers for every two fixed film media pods with diffusers. These ratios are variable.

Under those circumstances where the fixed film media pod has a diffuser, the diffuser will be positioned in the interior of the tank. The diffuser is adapted to aerate liquid in the interior of the tank. In particular, the diffuser is affixed to a side of the fixed film media pod. An air pump is connected to the diffuser so as to pass air into and through the diffuser. A weighted member is connected to the diffuser. The weighted member is adapted to maintain the fixed film media pod and the diffuser in a generally vertical orientation. The weighted member includes a receptacle affixed to or adjacent to the bottom of the diffuser and a plurality of weight elements received in the receptacle. In particular, in the preferred embodiment of the present invention, the receptacle is a pipe. The diffuser has a threaded portion at the bottom of the diffuser. The pipe has a coupling threadedly secured to the threaded portion. The plurality of weight elements includes lead shot received in the pipe. The pipe is capped at the end opposite the coupling. A blind disc encapsulates the lead shot and separates the lead shot from the diffuser.

The present invention is also a fixed film media pod for treating wastewater. This fixed film media pod comprises a generally tubular structure of a mesh material, a top ring surrounded by or surrounding the mesh material, a bottom ring surrounded by or surrounding the mesh material, at least one float affixed to the generally tubular structure adjacent to the top ring, and at least one weight positioned at or adjacent to a bottom of the generally tubular structure.

The weight comprises a weighted ring affixed to the generally tubular structure. This weighted ring comprises a wire or cable formed into a generally circular configuration. In the preferred embodiment, the wire or cable is of a metallic material. This wire or cable has a weight of approximately two ounces. The wire cable has free ends. These free ends are connected into the generally circular configuration by a tubular member. The weighted ring is secured to the generally tubular structure by fasteners.

The weighted ring is positioned slightly above the bottom ring. In the preferred embodiment, the bottom ring extends around an interior of the generally tubular structure. The weighted ring also extends around the interior of the generally tubular structure.

The present invention is also a fixed film media pod for aerating wastewater in a tank. This fixed film media pod comprises a generally tubular structure of a mesh material in which the polymeric mesh material has openings framed by the mesh material, a top ring surrounded by or surrounding the mesh material, a bottom ring surrounded by or surrounding the mesh material, at least one float affixed to the generally tubular structure adjacent to the top ring, a diffuser affixed to the generally tubular structure and adapted to aerate the wastewater in the tank, an air pump connected to the diffuser so as to pass air into and through the diffuser, and a weighted member connected to the diffuser. The weighted member is adapted to maintain the generally tubular structure and the diffuser in a generally vertical orientation.

In this fixed film media pod, there is at least one weight positioned at or adjacent to the bottom of the generally tubular structure. The diffuser is affixed to a side of the generally tubular structure. The weighted member includes a receptacle affixed to or adjacent to the bottom of the diffuser and a plurality of weight elements received in the receptacle.

In the present invention, there are two distinct weights. One weight is a wire weight that can be positioned on each of the fixed film media pods. In this manner, all of the pods are stabilized. The wire weight counters the buoyancy of the floats. This will maintain the top of the fixed film media pod approximately two inches under the water level and will maintain the fixed film media pods in a vertical position and keeps it from tilting under the buoyancy of the microbes and other debris accumulating on the pod media. The other weight is a weight for the diffuser. The diffuser weight is installed only on a stabilized pod which has the wire weight and is installed only when a diffuser is installed on a pod. This diffuser weight can be attached to the diffuser and can be installed separate from the diffuser on an interior of the fixed film media pod under and behind the diffuser. The diffuser weight is designed to keep the already stabilized pod from tilting due to the air in the diffuser.

This foregoing Section is intended to describe, with particularity, the preferred embodiments of the present invention. It is understood that modifications to this preferred embodiment can be made within the scope of the present claims. As such, this Section should not to be construed, in any way, as limiting of the broad scope of the present invention. The present invention should only be limited by the following claims and their legal equivalents.

DETAILED DESCRIPTION OF THE INVENTION

Figure 1:
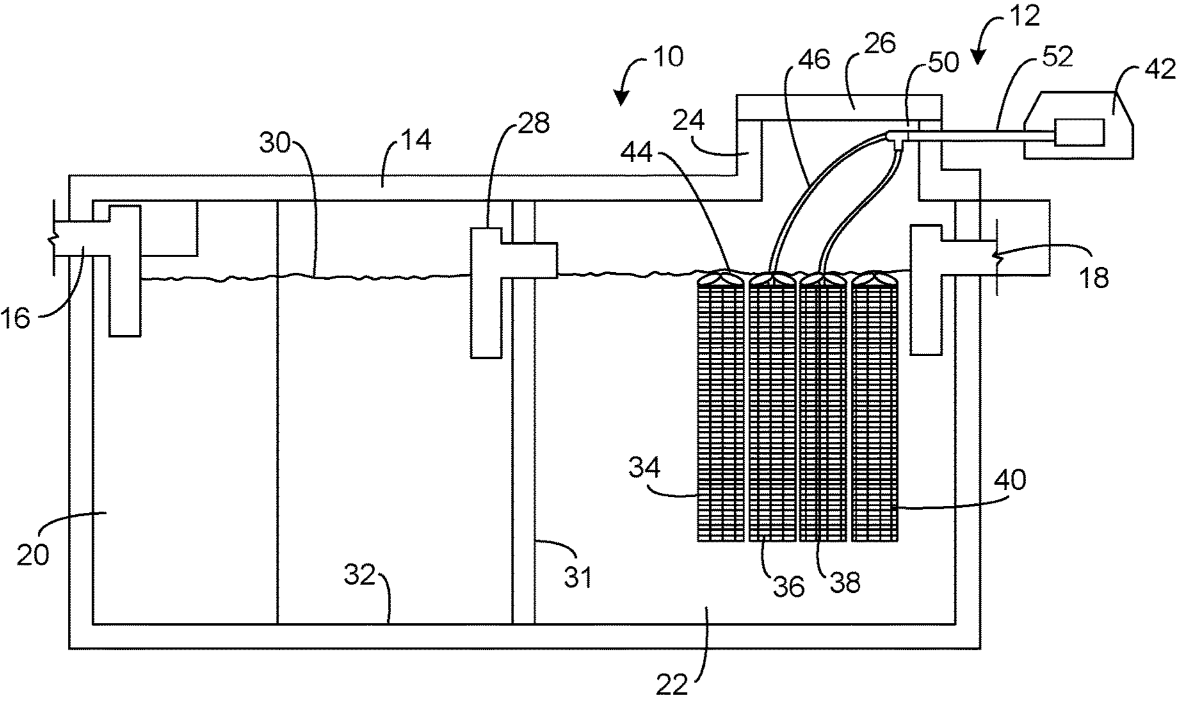
FIG. 1 is a cross-sectional view of a wastewater treatment septic tank employing the wastewater treatment apparatus of the present invention.

Referring to FIG. 1, there is shown a wastewater treatment system 10 employing the biofilm reactor 12 of the present invention. Specifically, FIG. 1 shows a tank 14 having an inlet 16 and an outlet 18. The tank 14 includes a first compartment 20 and a treatment compartment 22. The tank 14 includes a riser opening 24 at a top of the tank 14. A lid 26 extends over the riser opening 24. The inlet 16 is adapted to allow wastewater to enter the interior of the tank 14. Specifically, in the embodiment shown in FIG. 1, the inlet 16 is adapted to allow wastewater to enter into the first compartment 20 of the tank 14. An outlet 28 is formed on the wall 31 in tank 14 so as to allow the liquid in the first compartment 20 of tank 14 to flow into the treatment compartment 22 of tank 14. It can be seen in FIG. 1 that the wastewater has a surface 30. The outlet 18 is adapted to allow effluent to exit the tank 14.

Specifically, with reference to FIG. 1, a two compartment tank 14 is illustrated. However, within the concept of the present invention, the biofilm reactor 12 can be employed in a single tank or in a single compartment tank. In the configuration shown in FIG. 1, the wastewater will enter through the inlet 16 and reside in the first compartment 20. Solids will settle to the bottom 32 of the tank 14. Ultimately, as the liquid in the first compartment 20 rises, it reaches a level of the outlet 28 and then flows into the treatment compartment 22. The biofilm reactor 12 of the present invention can then introduce air into the wastewater in the interior of the treatment compartment 22. After the aerobic treatment is achieved in the treatment compartment 22, the effluent can then flow through the outlet 18 and to a drainfield or to other disposal methods.

FIG. 1 shows that there are a plurality of fixed film media pods 34, 36, 38 and 40 configured in a Drewery array and positioned in the interior of the tank 14. Each of a plurality of fixed film media pods 34, 36, 38 and 40 is formed of a material having openings framed by the material. Diffusers (shown in FIGS. 2-4) are positioned in the interior of the tank 14. The diffusers are adapted to aerate the liquid in the interior of the tank and, in particular, in the treatment compartment 22 of tank 14. An air pump 42 is connected to the diffusers. This air pump 42 is positioned exterior of the tank 14.

Each of the plurality of fixed film media pods has a generally tubular structure extending vertically in the interior of the tank 14. It can be seen that the tubular structures of the plurality of fixed film media pods 34, 36, 38 and 40 is positioned above the bottom 32 of the tank 14. Each of the fixed film media pods 34, 36, 38 and 40 has a float 44 at a top thereof. These floats 44 are adapted to cause the plurality of fixed film media pods 34, 36, 38 and 40 to float slightly below the surface 30 of the liquid in the tank 14 and above the bottom 32 of the tank 14. Air lines 46 and 48 extend from the air pump 42 to diffusers positioned on the fixed film media pods 36 and 38, respectively.

In FIG. 1, it can be seen that each of the plurality of fixed film media pods 34, 36, 38 and 40 has an outer diameter less than an inner diameter opening of the riser 24. In the configuration of the present invention shown in FIG. 1, the plurality of fixed film media pods 34, 36, 38 and 40 are formed of a mesh structure with openings framed by the material. The floats 44 are respectively affixed to the fixed film media pods 34, 36, 38 and 40. Each of the fixed film media pods 34, 36, 38 and 40 is installed through the access opening of the riser 24 of the tank 14 and into the liquid in the interior of the tank such that the fixed film media pods 34, 36, 38 and 40 reside above the bottom 32 of the tank 14 and slightly below the surface 30 of the liquid in the tank. The access opening is positioned directly above the fixed film media pods. Each of the fixed film media pods 34, 36, 38 and 40 is of a vertical orientation. The air diffusers are introduced through the access opening of the riser 24 and into the liquid within the tank 14. In the preferred embodiment the present invention, at least one diffuser will be affixed to a surface of at least one of the fixed film media pods 34, 36, 38 and 40 and positioned above the bottom 32 of the tank 14. As will be described hereinafter, the diffuser will be positioned generally above the bottom of the fixed film media pods. Not all of the fixed film media pods 34, 36, 38 and 40 have diffusers thereon. It is only necessary to affix diffusers in accordance with the aeration requirements for the particular wastewater being treated. The air diffusers are connected to the air pump 42 through the side of the riser 24. Specifically, the ends of the air lines 46 and 48 are connected to a T-fitting 50 which joins to a line 52 extending to air pump 42. The air pump 42 can then be activated so as to introduce air through the lines 52, 46 and 48 such that air is diffused by the fine air diffusers located on the fixed film media pods 36 and 38. As such, the liquid on the interior of the treatment compartment 22 of tank 14 is aerated and mixed.

Experiments with the present invention have shown that the Drewery array of fixed film media pods 34, 36, 38 and 40, in combination with the aeration capabilities, greatly improves the quality of the effluent released through the outlet 18. This allows wastewater to circulate through the media from all directions and provides for long stringy colonies of biofilm that form and wave in the circulation. This provides more treatment per square foot of media than in previous applications. Specifically, tests have shown that the total suspended solids released will be in single digits and the carbonaceous biochemical oxygen demand will be of single digits. This is less than the total suspended solids of thirty and the carbonaceous biochemical oxygen demand of twenty-five required by standards. As such, the effluent can be directly released into a drainfield or to other locations in an exterior environment without further treatment.

The installation occurs very easily. Since each of the fixed film media pods 34, 36, 38 and 40 has a diameter less than the diameter of the opening of the riser 24, they can be simply placed into the tank 14 by removing the lid 26. The floats 44 allow each of the fixed film media pods 34, 36, 38 and 40 to float in a desired positioned within the liquid in the tank 14. In the preferred embodiment of the present invention, each of the fixed film media pods 34, 36, 38 and 40 will have an 8½ inch diameter. The floats will cause each of the fixed film media pods 34, 36, 38 and 40 to float approximately two inches under the surface 30 of the liquid and approximately eight to twelve inches off the bottom 32 of the tank 14. Each of the fixed film media pods 34, 36, 38 and 40 will be formed of a tubular mesh media. Although the present invention shows the fixed film media pods 34, 36, 38 and 40 of a tubular shape and, it is possible within the present invention that the various other shapes of the mesh and other materials can suffice for carrying out wastewater treatment. The shapes can include planar shapes, rectilinear shapes, oval shapes, etc. This mesh media has openings of approximately 1.5×1.5 inches. The material of this mesh material will frame each of the holes. This material can be a polymer or a metallic material, such as aluminum. The framing will, in the preferred embodiment, have a width of approximately 3⁄16 of an inch and a thickness of approximately 1⁄32 of an inch. It is possible within the concept of the present invention that materials other than polymeric material can be used. Importantly, as wastewater is being treated in the tank 14, the microorganisms will accumulate on the surfaces of the mesh material. The configuration of each of the fixed film media pods 34, 36, 38 and 40 creates a labyrinth through which the wastewater flows. As the microorganisms accumulate on the surfaces of the fixed film media pod they will form strands (up to two inches or more in length) which further attract other organisms thereon. The combination of the diffuser, the position of the diffuser, and the fixed film media pods causes the flow of the wastewater to pass through the maze created by the fixed film media pod. The biofilm accumulates and extends in a far greater amount than would be expected. The elongation of the microorganisms is believed to be caused by the configuration by the framed openings of the mesh material. This configuration allows highly oxygenated wastewater effluent to flow in all directions through the labyrinth of the mesh material. This configuration increases the number of microorganisms that can be accumulated on the fixed film media pods, causes strands of microorganisms to be created, and reduces the amount of media required to actually treat the wastewater thereby creating the biofilm reactor.

Within the concept of the present invention, the fixed film media pods 34, 36, 38 and 40 are preferably of a cylindrical configuration. However, any tubular structure will suffice. Also, in the present invention, an interior mesh (as described herein association with FIG. 5) can be incorporated so as to further enhance the "biomaze effect" of the present invention. Although FIG. 1 shows two diffusers, more or fewer diffusers can be used relative to the requirements for oxygen to feed the microbes within the tank. Under certain circumstances, a single diffuser can be appropriate when the biological oxygen demand is low enough.

The clean effluent released through the outlet 18 of the wastewater treatment system 10 of the present invention allows for the recovery of drainfields. As such, the clogging of drain fields associated with prior art systems is avoided. As a result, the life of the wastewater treatment system 10 is extended. The biofilm reactor 12 of the present invention can be installed without the need to replace the existing tank 14. As such, the present invention avoids septic tank and drainfield replacement costs. Since the tank 14 does not need to be removed nor the drainfield replaced, there will be no destruction of property as a result of the installation of the biofilm reactor 12 of the present invention. The Drewery array of the fixed film media pods 34, 36, 38 and 40 of the present invention greatly reduces pollutants released through the outlet 18 and into the environment. As such, the present invention serves to protect the environment. The biofilm reactor of the present invention can be installed very quickly and easily through the opening provided in the riser 24 of the tank 14. No heavy equipment is required. The present invention has greater than 90% of the wastewater treatment occurring within the interior of the tank 14. As such, there is less need for the drainfield to complete the wastewater treatment. The present invention releases a clear and odorless effluent. Also, the present invention does not require any clarifiers. The position of the diffusers above the bottom 32 of the tank 14 avoids any stirring of sludge at the bottom of the tank. Thus preventing solids from leaving the tank outlet and allowing for proper sludge management (i.e. pumping the sludge during normal tank pump-out). The present invention also has minimal transport costs.

Figure 2:
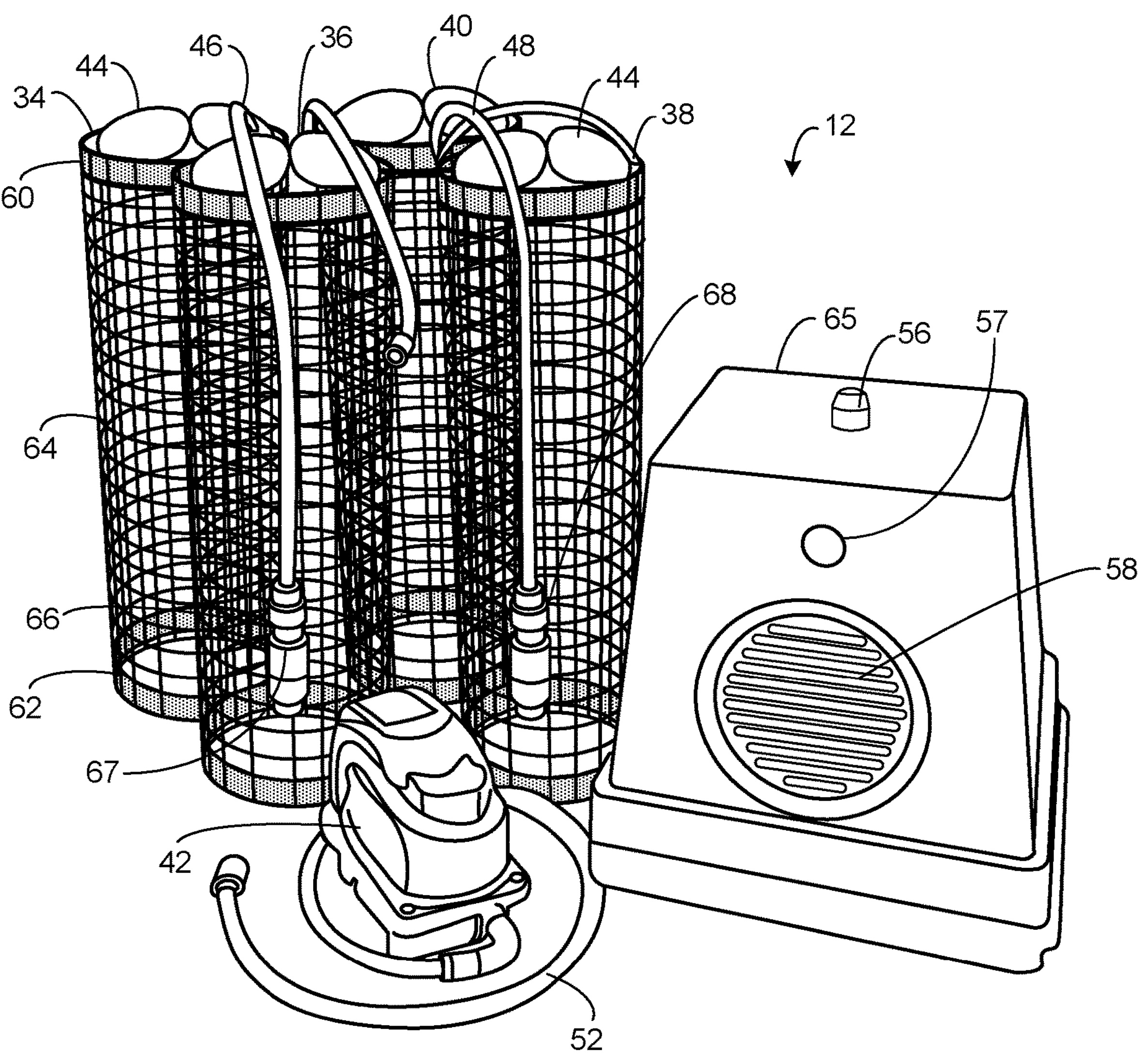
FIG. 2 is an upper perspective view showing the wastewater treatment apparatus of the present invention in which the components are separated from each other.

FIG. 2 shows, in particular, a housing 65 for the air pump 42. Housing 65 has an alarm 56 at a top surface thereof. The housing 65 includes a vent 58 on an exterior surface thereof. Housing 65 will cover the air pump 42 and protect the air pump 42 from the exterior environment. Air pump 42 is illustrated as having air line 52 affixed thereto and extending therefrom. A visual alarm 56, in the nature of a warning light, can be positioned at a top of the housing 65. Alarm 56 will be indicative of a malfunction of the air pump 42 of the system. An audible alarm 57 can also be positioned at a face of the housing 65. The audible alarm 57 can also be indicative of a malfunction of the air pump 42.

FIG. 2 shows the fixed film media pods 34, 36, 38 and 40. In particular, in FIG. 2, it can be seen that each of the fixed film media pods 34, 36, 38 and 40 has a top ring 60 and a bottom ring 62. The mesh material 64 will be wrapped over the top ring 60 and the bottom ring 62. Top ring 60 and bottom ring 62 are configured so as to provide structural integrity to the fixed film media pods 34, 36, 38 and 40. It can be seen that the mesh material 64 defines openings that are surrounded by the material. Floats 44 are provided at a top of each of the fixed film media pods 34, 36, 38 and 40. Floats 44 can be any number of floats required so as to maintain the fixed film media pods 34, 36, 38 and 40 in their desired positions within the interior of the tank 14.

FIG. 2 shows that there is a diffuser 66 affixed to the fixed film media pod 36. Similarly, another diffuser 68 is attached to the fixed film media pod 38. Diffusers 66 and 68 can be separate from the fixed film media pods or they can be attached to the surface of the fixed film media pods. A surface-mounted location is superior since this creates a simple installation procedure. Additionally, the installation of the diffusers 66 and 68 onto the surface of the respective fixed film media pods 36 and 38 assures that the diffusers 66 and 68 are elevated above the bottom 32 of the tank 14. If the diffusers 66 and 68 would be positioned too low and/or adjacent to the bottom 32 of the tank 14, the diffusers would tend to stir up the material that has sloughed off the fixed film media pods. As such, this will adversely affect sludge management and the quality of the effluent being released through the outlet 18 of tank 14. An air line 46 is illustrated as connected to the diffuser 66. An air line 48 is illustrated as connected to the diffuser 68. Air lines 46 and 48 will connect to the air line 52 associated with the air pump 42. Each of the diffusers 66 and 68 is a fine air diffuser having fine pores so as to release small microbubbles into the liquid within the interior of the tank 14. Under certain circumstances, course bubble diffusion will work depending on the oxygen dissolving requirements of the wastewater treatment system. As such, in the preferred embodiment of the present invention, a fine air diffuser is used, but this should not be construed as limiting of the type of the diffuser. The type of diffuser is largely dependent upon the requirements of the wastewater. A weight 67 is added at the bottom of each of the diffusers 66 and 68 (in the manner shown in FIG. 11).

Figure 3:
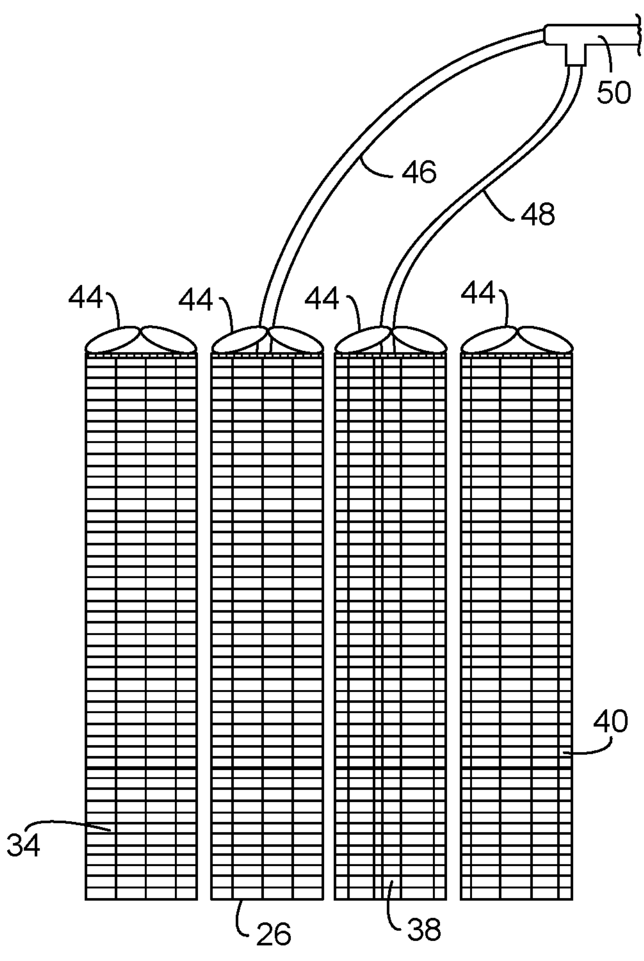
FIG. 3 is a side elevational view of the Drewery array of fixed film media pods as employed in the wastewater treatment apparatus of the present invention.

FIG. 3 is an isolated view showing the configuration of the fixed film media pods 34, 36, 38 and 40. Each of the fixed film media pods 34, 36, 38 and 40 is arranged so as to float into a random configuration of pods. Alternatively, the fixed film media pods 34, 36, 38 and 40 can be arranged in a rectilinear configuration. Generally, the configuration of the fixed film media pods 34, 36, 38 and 40 will be "self-positioning" within the liquid in the tank. As such, the fixed film media pods can move rather randomly in any direction during the wastewater treatment process. Floats 44 are positioned at the top of each of the fixed film media pods 34, 36, 38 and 40. Air lines 46 and 48 extend outwardly from T-fitting 50 so as to join with diffusers 66 and 68 of fixed film media pods 36 and 38, respectively. The diffusers are shown in greater detail in FIGS. 10 and 11. Within the concept of the present invention, fewer than four fixed film media pods or greater than four fixed film media pods can be used depending on the size of the treatment facility and the wastewater being treated. The size of each of the pods can be adapted to the needs of the wastewater treatment system. Suitable fasteners could be used so as to secure the fixed film media pods 34, 36, 38 and 40 together. Importantly, the present invention is a "modular" system. As such, the fixed film media pods can be added or removed as needed. It can easily be customized to the treatment requirements of the wastewater treatment system.

Figure 4:
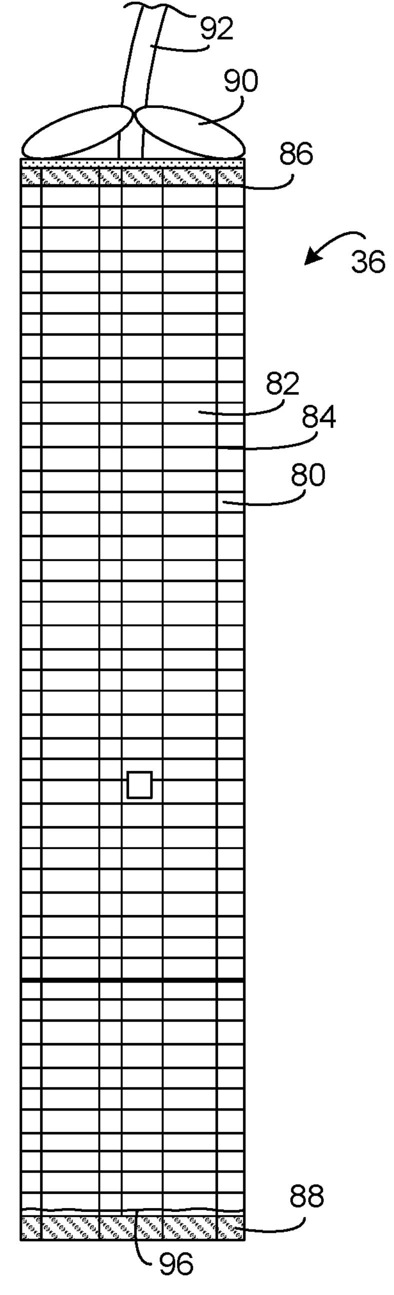
FIG. 4 is an isolated side elevational view of a single fixed film media pod as employed in the wastewater treatment apparatus of the present invention.

FIG. 4 shows a single fixed film media pod 36 of the present invention without a diffuser attached. Within the concept of the present invention, there are certain circumstances wherein a single fixed film media pod 36 can be used for the treatment of wastewater in the biofilm reactor. It can be seen that fixed film media pod 36 has a generally tubular structure 80 of a mesh material. The mesh material has openings 84 framed by the mesh material. There is a top ring 86 and a bottom ring 88 surrounded by the mesh material 82. At least one float 90 is affixed to the generally tubular structure 80 adjacent to the top ring 86.

Importantly, in the present invention, it should be noted that the fixed film media pod 36 is configured to so as to receive microbes and other materials onto the various surfaces of the fixed film media pod 36. As more and more of these microbes and other materials accumulate on the surfaces, there is a tendency for these microbes and other materials to create a certain amount of buoyancy in the fixed film media pod. Upon the receipt of a sufficient amount of microbes and other materials, the buoyancy of such microbes and other materials can cause the fixed film media pod 36 to assume a non-vertical orientation within the wastewater in the tank. This is a less-than-optimal configuration. As such, in order to compensate for this lean created by the accumulation of microbes and other materials, a weight 96 is affixed adjacent to the bottom ring 88 or adjacent to the bottom of the fixed film media pod 36. The specific configuration of this weight is illustrated in greater detail in association with FIGS. 8 and 9. The weight 96 will counter the buoyancy of the microbes and other materials accumulated on the surfaces of the fixed film media pod 36. This will cause the generally tubular structure 80 to remain in a vertical orientation within the liquid within the wastewater treatment tank. The weight can be in the nature of a weighted ring that is affixed by polymeric fasteners to the generally tubular structure 80 of the fixed film media pod 36.

Figure 5:
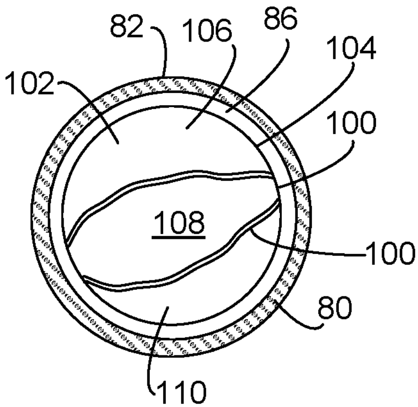
FIG. 5 is a cross-sectional view of the fixed film media pod of the present invention in a cross-sectional plane parallel to the longitudinal axis of the fixed film media pod.

FIG. 5 is a cross-sectional view of the fixed film media pod 36 of FIG. 4. This is a cross-sectional view taken in the plane transverse to the longitudinal axis of the tubular structure 80 or on a cross-sectional view taken in a plane parallel to the bottom 32 of the tank 14. In FIG. 5, the top ring 86 is particularly illustrated as having a circular configuration. The mesh material 82 is affixed to the exterior of the top ring 86. However, within the concept of the present invention, the mesh material 82 can be affixed to the interior of the top ring 86. A similar configuration would occur with respect to the bottom ring 88. Importantly, there is an interior mesh material 100 that is positioned in the interior 102 of the generally tubular structure 80. This interior mesh 100 has a generally teardrop shape. This teardrop shape is created by taking a panel of the mesh material and folding it over so that ends of the mesh material can join with one another at ends 104. As such, this teardrop shape of interior mesh 100 will create three compartments 106, 108 and 110 of generally similar volume within the interior of the generally tubular structure 80. This will further create the "biomaze" through which the wastewater must pass and also increases the area of media of each pod. As such, the use of this interior mesh greatly enhances the ability of the fixed film media pod to treat the wastewater. It is believed that the interior mesh can enhance the ability of the fixed film media pod to treat wastewater however, depending on the requirements of the wastewater treatment system, this interior mesh may or may not be necessary.

Figures 6, 7:
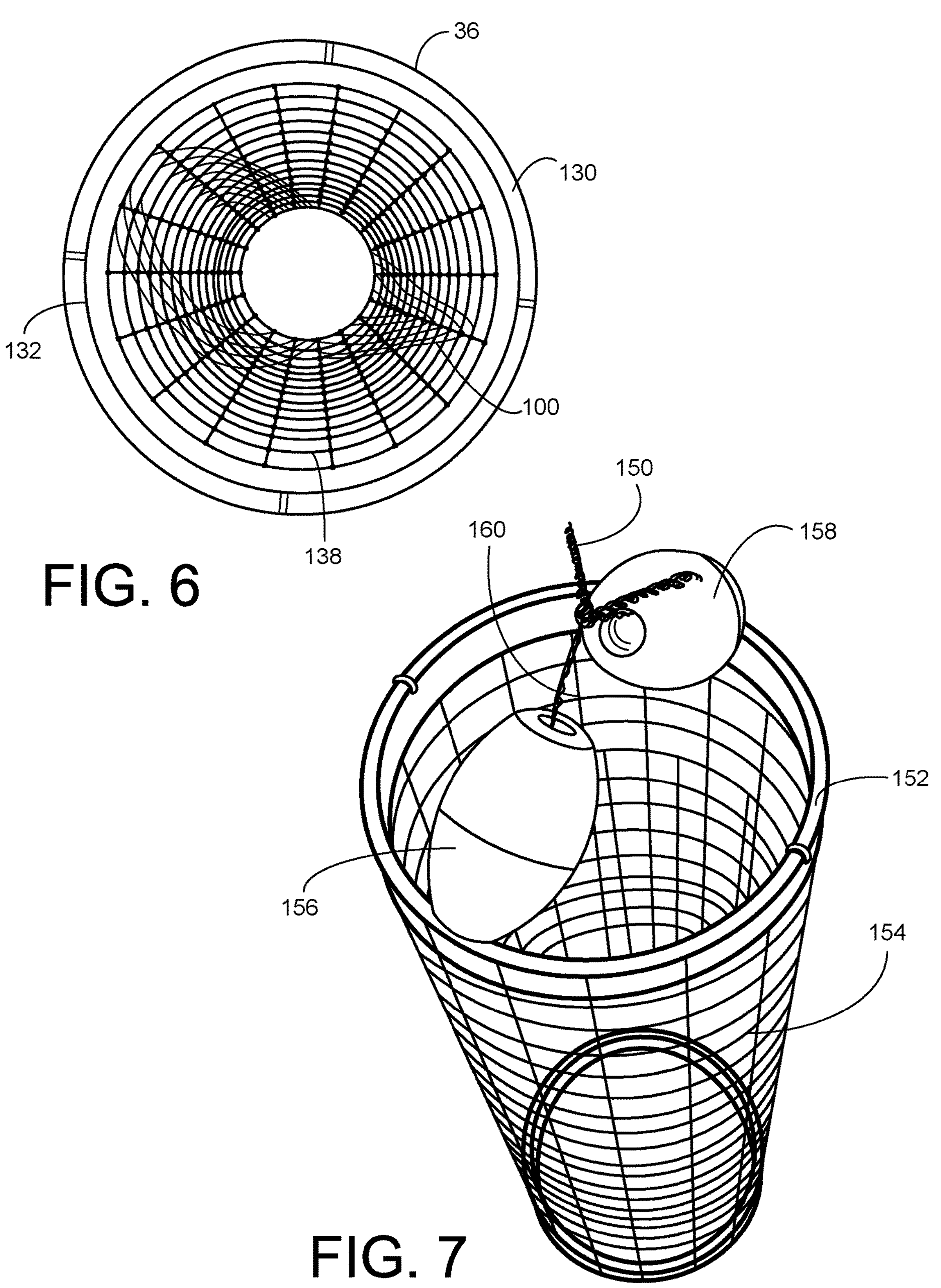
FIG. 6 is a bottom view of the fixed film media pod of the wastewater treatment apparatus of the present invention.
FIG. 7 is a perspective view of the fixed film media pod showing the line extending from the fixed film media pod.

FIG. 6 is a bottom view of the biofilm reactor 36 of the present invention. In particular, FIG. 6 shows that the interior mesh 100 is of a teardrop shape. The biofilm reactor 36 has a weighted member 132 affixed thereto. The weighted member 132 is affixed to the mesh of the biofilm reactor 36 and extends around an inner diameter of the biofilm reactor adjacent to the bottom ring 130. The weighted member 132 is, in particular, a weighted ring. This weighted ring is either a wire or cable formed into a generally circular configuration. In the preferred embodiment, this wire or cable is of a metallic material. However, in other embodiments, the wire or cable could be formed of other materials, such as a polymer. In the preferred embodiment of the present invention, and as tested, the wire cable has a weight of approximately two ounces. As will be described hereinafter, the wire cable has free ends. These free ends are connected in the circular configuration by a tubular member. This continuous circular weighted ring of the weighted member 132 assures that the biofilm reactor 36 is of a vertical configuration within the liquid of the wastewater tank. The weighted member 132 is secured to the mesh of the biofilm reactor 36 through the use of a polymeric fasteners, such as zip-ties (to be described hereinafter). This weighted member 132 is required on all pods. This includes the pods that have a diffuser and those that do not have a diffuser. Those pods that have a diffuser will also require an additional weight (as described hereinafter).

FIG. 7 shows a line 150 as affixed adjacent the top ring 152 of the tubular structure 154. The interior mesh structure has been omitted for the purposes of clarity in FIG. 7. Specifically, line 150 is a rope. However, line 150 could be a chain, a strap, a cord, a wire or similar structure. The line 150 is illustrated as extending upwardly and away from tubular structure 154. In FIG. 7, there are a pair of floats 156 and 158 that each have one end secured to the top ring 152 and/or to the tubular structure 154. A linking line 160 extends between floats 156 and 158. Line 150 is shown as connected at one end to the linking line 160. The line 150 is adapted to allow a person to raise and/or lower the fixed film media pod through the access opening and from and into the liquid in the wastewater treatment tank. The upper end of line 150 can be clipped or secured adjacent to the access opening so as to allow for easy and convenient installation and removal of the fixed film media pod (along with the diffuser if attached). This greatly enhances the ability to maintain the fixed film media reactor.

Figure 8:
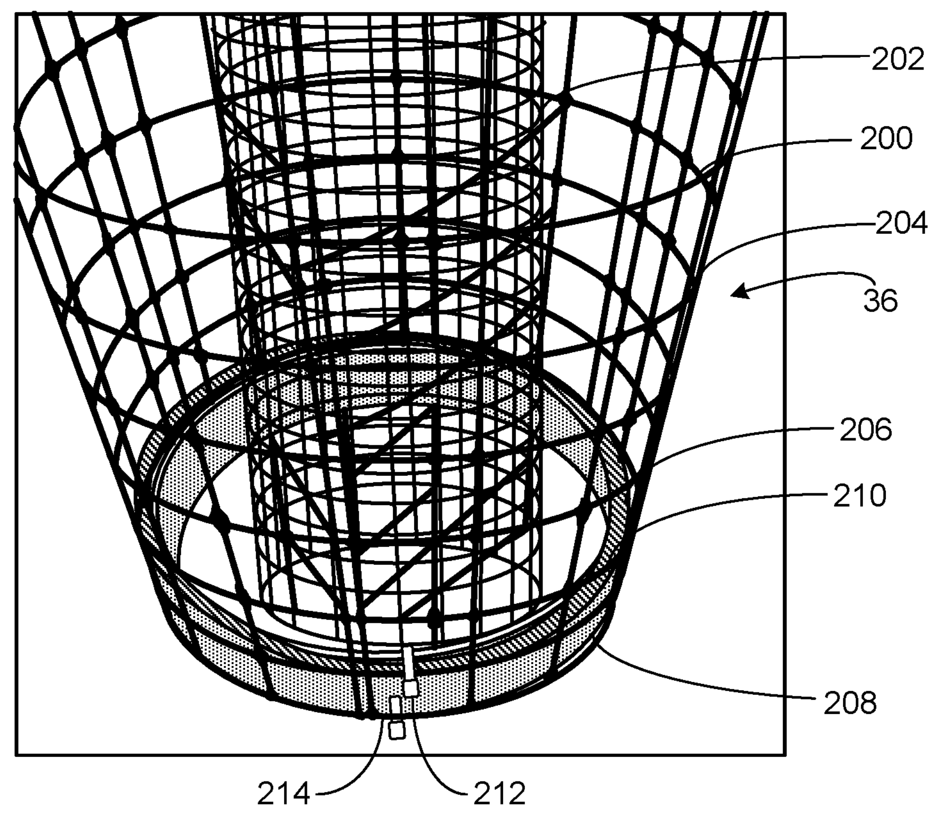
FIG. 8 is an upper perspective view showing the placement of the weighted ring adjacent to the bottom of the generally tubular structure of the fixed film media pod.

FIG. 8 is a detailed view of the biofilm reactor 36 of the present invention. As can be seen, this biofilm reactor 36 is formed of a mesh material 200. As can be seen, there is an interior mesh structure 202 formed within the generally tubular structure 204 of biofilm reactor 36. FIG. 8 shows, in particular, the structure of the weight 206 located generally adjacent to the bottom ring 210 of the biofilm reactor 36. The biofilm reactor 36 has the bottom ring 210 adjacent to the bottom thereof. Bottom ring 210 is secured to the mesh 200 of the tubular structure 204 with the use of polymeric fasteners 212. These polymeric fasteners 212 are in the nature of zip-ties.

The weight 206 is a weighted ring that is affixed to the mesh structure 200 of the tubular structure 204. This weighted ring is, as can be seen, a wire or cable formed into a generally circular configuration. Specifically, in the preferred embodiment, this wire or cable is of a metallic material. It has been found, through experimentation, that this wire cable should have a weight of approximately two ounces. However, depending on the size of the fixed film media reactor 36, this wire cable can have different weights.

The weight 206 is secured to the fixed film media reactor 36 through the use of fasteners 214. These fasteners are, specifically, a plurality of zip-ties wrapped around the weight 206 and around a surface of the mesh structure 200 of the tubular structure 204. The zip-ties are in spaced relation relative to each other. The weight 206 is positioned slightly above the bottom ring 210.

The use of the weighted ring of weight 206 is relatively easy to use and operates more effectively than the separate weighted members of the parent application. In particular, the weight 206 is secured to the mesh structure 200 through the use of polymeric zip-ties. As such, it is permanently secured to the mesh structure 200. The abrasive elements found within the wastewater liquid will not adversely affect the connection between the weight 206 and the biofilm reactor 36. Additionally, the weight 206 is of a circular configuration. As such, it distributes weight evenly around the interior circumference of the mesh structure 200. Since the weight 206 is a weighted ring, it is very simple to install by simply inserting through the bottom opening of the biofilm reactor and placing in a location above the bottom ring 210. The zip-ties can then be used so as to secure the weight 206 to the mesh structure 200.

Figure 9:
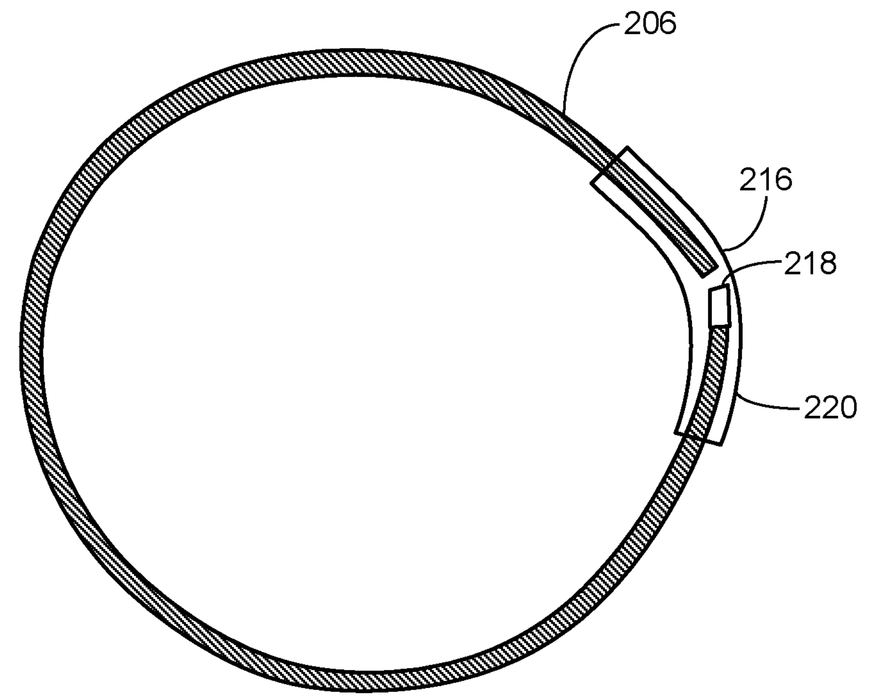
FIG. 9 is an isolated plan view of the weighted member as used in the fixed film media pod of the present invention.

FIG. 9 shows the specific configuration of the weight 206. FIG. 9 shows the weight 206 in a circular configuration. The weight 206 is a ring that is formed of a wire or cable and has free ends 216 and 218. The free ends 216 and 218 are joined together through the use of a tubular connector 220. The tubular connector 220 can be made of a polymeric material so as to avoid corrosion within the corrosive environment of the liquid within the wastewater treatment tank.

The circular nature of the weight 206 assures even distribution of forces countering the buoyancy of the floats. As such, this weight 206 will cause the biofilm reactor 36 to float slightly below the surface of the wastewater within the tank and to maintain a generally vertical orientation. During installation, there is no possibility of error caused by the improper distribution of weight by the placement of separate weights at the bottom of the biofilm reactor 36. The present invention avoids any adverse effects of corrosion that could result from the adhesive connections of the weight to the biofilm reactor 36. As such, the use of the weight 206 assures a superior performance of the biofilm reactor 36 of the present invention.

Figures 10, 11:
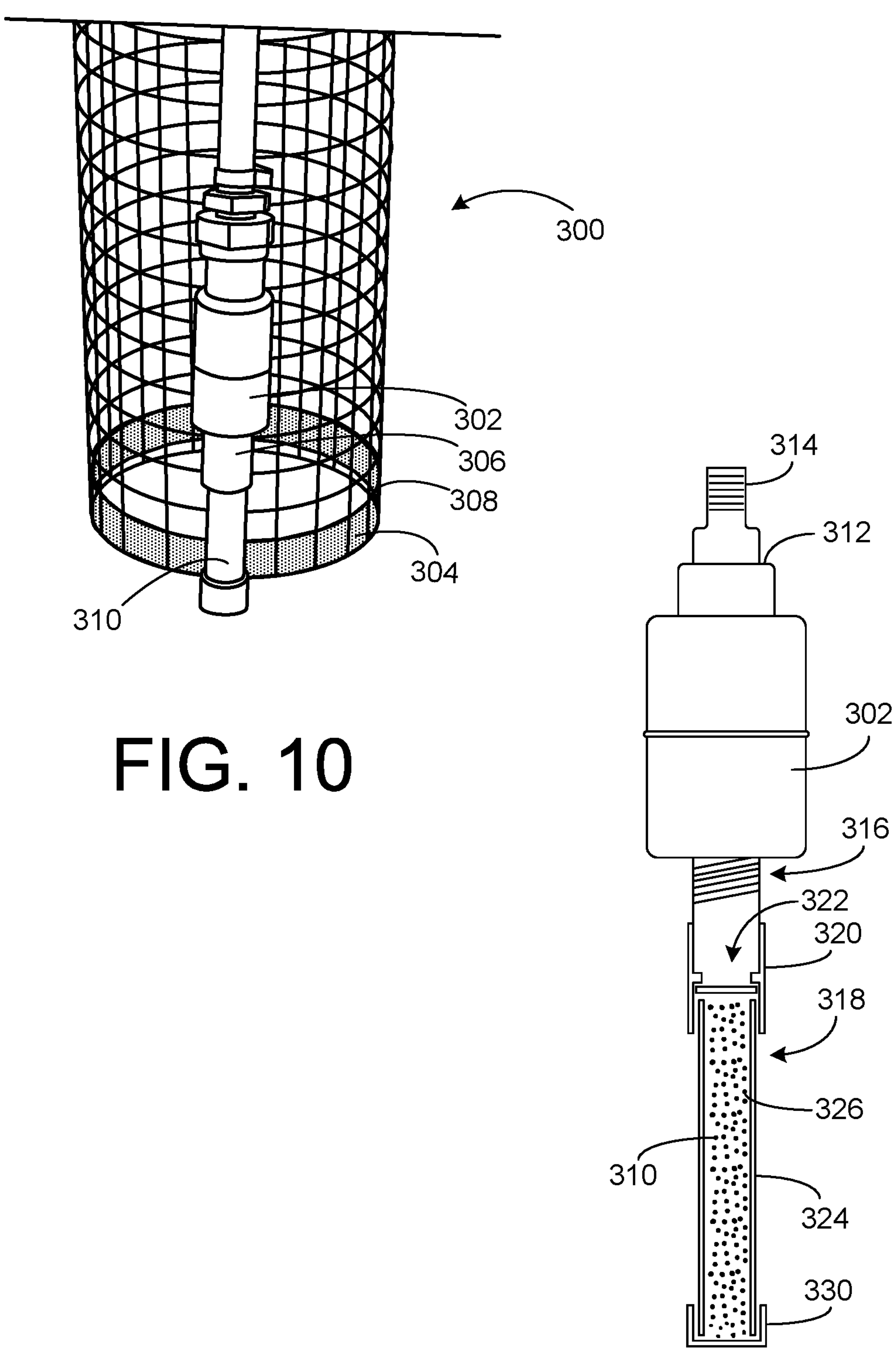
FIG. 10 is a perspective view showing the diffuser and weighted member as affixed to a side of the fixed film media pod.
FIG. 11 is a cross-sectional side view of the diffuser and weighted member associated with the fixed film media pod of the present invention.

Referring to FIG. 10, there is an illustration of the fixed film media pod 300 having a diffuser 302 affixed thereto. The interior mesh structure has been omitted from FIG. 10 for the purposes of clarity. The fixed film media pod 300 has a bottom ring 304, a mesh material 306 and a weighted member 310 in the nature of the previous embodiment shown in association with the structure of the fixed film media pod without a diffuser. The diffuser 302 is affixed to the side of the fixed film media pod 300. The diffuser 302 is adapted to aerate the wastewater in the tank. An air pump can be connected to the diffuser so as to pass air into and through the diffuser. Weighted member 310 is connected to the diffuser 302. The weighted member is adapted to maintain the generally tubular structure 306 and the diffuser 302 in a generally vertical orientation.

It should be noted that the positioning of the diffuser 302 along the generally tubular structure 306 of the fixed film media pod 300 can cause the generally tubular structure 306 to deflect as a result of air bubbles inside the fine air diffuser 302. This could cause the generally tubular structure 306 to lean at an improper angle. As such, in order to compensate for this lean, the weighted member 310 is illustrated as affixed to the bottom of the diffuser 302. A specific configuration of this weighted member 310 is illustrated in greater detail in association with FIG. 11. The weighted member 310 will counter the forces of air passing into and through the diffuser 302. As such, the generally tubular structure 306 will remain in a vertical orientation within the liquid within the wastewater treatment tank. A weight (in the nature of the weighted member 132 of the previous embodiments) will be affixed by polymeric fasteners to the generally tubular structure of the fixed film media pod 300.

FIG. 11 shows the configuration of the fine air diffuser 302 and the weighted member 310. It can be seen that the fine air diffuser has a suitable fitting 312 joined with a hose barb fitting 314 extending to an air pump. The barb fitting 314 connects to an air tube from the air pump. The air from the air pump and air tube will flow through the hose barb fitting 314 and through the fitting 312 into the interior of the diffuser 302. This air will pass through the fine grains of the diffuser 302 and be emitted as fine air bubbles within the wastewater.

The diffuser 302 has a threaded member 316 at a bottom thereof. The threaded portion 316 is adapted to receive a receptacle 318 at a bottom thereof. The receptacle 318 is affixed to or adjacent to the bottom of the diffuser 302. A coupling 320 is formed on the receptacle 318 and is adapted to couple to the threaded portion 316 at the bottom of the diffuser 302. A blind disk 322 is fitted within the interior of the coupling 320 at the top of the receptacle 318.

The receptacle 318 is, in the preferred embodiment of the present invention, a PVC pipe 324 that is filled with a plurality of weighted elements 326. The plurality of weighted elements 326 is in the nature of lead shot. A cap 330 is affixed to the bottom of the pipe 324 opposite the coupling 320.

It should be noted that the extended length of the pipe 324, along with the weight of the lead shot within the pipe 324, creates a type of "cantilever" effect that serves to maintain the vertical orientation of the diffuser 302 and the fixed film media pod 300. The pipe 324 can extend downwardly from the bottom of the diffuser 302 such that the cap 330 can be generally adjacent to the bottom of the fixed film media pod.

With reference to the diffuser 302 and the weighted member 310, as shown in FIG. 11, these items can be offset from each other within the concept of the present invention. In particular, within the concept of the present invention, the diffuser can be positioned on an interior or an exterior of the fixed film media pod. The weighted member can be positioned separate from and directly below the diffuser on the interior or exterior of the fixed film media pod. Still further, the weighted member can be positioned on the interior of the fixed film media pod when the diffuser is positioned on the exterior of the fixed film media pod. Still further, and alternatively, the diffuser can be placed on the interior of the fixed film media pod while the weighted member is positioned on the exterior of the fixed film media pod. Ideally, the weighted member should be placed below and in proximity to the diffuser in any of these configurations. The configuration shown in FIG. 11 is exemplary of a preferred form of the weighted member. However, various other configurations of diffusers and weighted members can be made within the concept of the present invention. Ultimately, the weighted member 310 is only used when the fixed film media pod has a diffuser associated therewith. Those fixed film media pods that do not have a diffuser will not require the weighted member 310. The weighted ring will be sufficient to maintain the vertical orientation of the fixed film media pod (without a diffuser) within the tank.

The foregoing disclosure and description of the invention is illustrative and explanatory thereof. Various changes in the details of the illustrated construction can be made in the scope of the present invention without departing from the true spirit of the invention. The present invention should only be limited by the following claims and their legal equivalents.

We claim:

1. A wastewater treatment apparatus comprising:

a tank having an access opening therein, said tank having an inlet adapted to allow wastewater to enter an interior of said tank, said tank having an outlet adapted to allow an effluent to exit said tank;

at least one fixed film media pod positioned in the interior of said tank, said at least one fixed film media pod having openings framed by a material, said at least one fixed film media pod having at least one weight adjacent to a bottom thereof, the at least one weight adapted to maintain a generally vertical orientation of said at least one fixed film media pod in said tank;

a diffuser positioned in the interior of said tank at an exterior and at a side of said at least one fixed film media pod, said diffuser adapted to aerate liquid in the interior of adjacent tank;

an air pump connected to said diffuser so as to pass air into and through said diffuser;

a weighted member connected to said diffuser, said weighted member adapted to maintain said at least one fixed film media pod and said diffuser in a generally vertical orientation, said weighted member comprising:

a pipe affixed to a bottom of said diffuser, said diffuser having a threaded portion at a bottom thereof, said pipe having a coupling threadedly secured to the threaded portion; and a plurality of weighted elements received in said pipe, said pipe being capped at an end opposite the coupling.

2. The wastewater treatment apparatus of claim 1, the at least one weight comprising:

a weighted ring affixed to the at least one fixed film media pod.

3. The wastewater treatment apparatus of claim 2, said weighted ring comprising a wire or cable formed in a generally circular configuration.

4. The wastewater treatment apparatus of claim 3, the wire or cable having free ends, the free ends being connected together by a tubular member into the generally circular configuration.

5. The wastewater treatment apparatus of claim 2, said at least one fixed film media pod having a top ring and a bottom ring, said at least one fixed film media pod being formed of a mesh material extending over and around or under and around the top ring and the bottom ring.

6. The wastewater treatment apparatus of claim 5, said weighted ring positioned above the bottom ring.

7. The wastewater treatment apparatus of claim 1, each of said at least one fixed film media pod comprising a tubular structure extending vertically in the interior of said tank, the tubular structure being positioned above a bottom of said tank, wherein the tubular structure has an interior mesh structure extending generally across the interior diameter of the tubular structure.

8. The wastewater treatment apparatus of claim 1, wherein the access opening of said tank is positioned directly above said at least one fixed film media pod.

9. A fixed film media pod for aerating wastewater in a tank, the fixed film media pod comprising:

a generally tubular structure of a mesh material, the mesh material having openings framed by the mesh material;

a top ring surrounded by or surrounding the mesh material;

a bottom ring surrounded by or surrounding the mesh material;

at least one float affixed to said generally tubular structure adjacent to said top ring;

a diffuser affixed to an exterior of and to a side of said generally tubular structure, said diffuser adapted to aerate the wastewater in the tank;

an air pump connected to said diffuser so as to pass air into and through said diffuser; and a weighted member fastened below said diffuser or connected to said diffuser, said weighted member adapted to maintain said generally tubular structure and said diffuser in a generally vertical orientation, said weighted member comprising:

a pipe affixed to a bottom of said diffuser, said diffuser having a threaded portion at a bottom thereof, said pipe having a coupling threadedly secured to the threaded portion; and a plurality of weighted elements received in said pipe, said pipe being capped at an end opposite the coupling.

10. The fixed film media pod of claim 9, further comprising:

at least one weight positioned at or adjacent to a bottom of said generally tubular structure.

* * * * *